United States Patent
Kawamura et al.

(10) Patent No.: US 7,432,796 B2
(45) Date of Patent: Oct. 7, 2008

(54) SECURITY CONTROL SYSTEM FOR MANAGING REGISTRATION OF ID CODES FOR PORTABLE DEVICES

(75) Inventors: Daisuke Kawamura, Aichi (JP); Kiyokazu Ohtaki, Aichi (JP); Keiji Yamamoto, Okazaki (JP); Koichi Masamura, Toyota (JP); Takao Ozawa, Toyota (JP); Yoshihide Nakane, Okazaki (JP)

(73) Assignees: Kabushiki Kaisha Tokai Rika Denki Seisakusho, Aichi (JP); Toyota Jidosha Kabushiki Kaisha, Toyota-shi (JP)

( * ) Notice: Subject to any disclaimer, the term of this patent is extended or adjusted under 35 U.S.C. 154(b) by 620 days.

(21) Appl. No.: 11/058,831

(22) Filed: Feb. 16, 2005

(65) Prior Publication Data

US 2005/0179518 A1    Aug. 18, 2005

(30) Foreign Application Priority Data

Feb. 16, 2004    (JP)    ............................. 2004-038022

(51) Int. Cl.
- G05B 19/00 (2006.01)
- G06F 7/00 (2006.01)
- G06F 7/04 (2006.01)
- H04Q 1/00 (2006.01)
- H04B 1/00 (2006.01)

(52) U.S. Cl. .................. 340/5.23; 340/5.72; 340/426.1; 340/426.18; 340/426.2; 340/5.3; 340/5.33; 340/539.1; 340/5.5; 340/5.61

(58) Field of Classification Search ................ 340/5.23, 340/5.72, 426.1, 426.18, 426.2, 5.3, 5.33, 340/539.1, 5.5, 5.61

See application file for complete search history.

(56) References Cited

U.S. PATENT DOCUMENTS

| | | | |
|---|---|---|---|
| 6,122,580 A | | 9/2000 | Autermann |
| 6,333,703 B1 * | | 12/2001 | Alewine et al. ........ 340/995.13 |
| 6,538,557 B1 | | 3/2003 | Giessl |
| 6,900,723 B2 * | | 5/2005 | Yamanaka et al. ....... 340/426.1 |

FOREIGN PATENT DOCUMENTS

| | | |
|---|---|---|
| EP | 0 716 399 A1 | 6/1996 |
| EP | 1 020 335 A2 | 7/2000 |
| EP | 1 335 328 A2 | 8/2003 |
| JP | 11-168574 A | 6/1999 |
| JP | 2000-78280 A | 3/2000 |
| JP | 2001-289142 A | 10/2001 |
| JP | 2001-311333 A | 11/2001 |
| JP | 2002-337662 A | 11/2002 |

* cited by examiner

*Primary Examiner*—Brian Zimmerman
*Assistant Examiner*—Nam V. Nguyen
(74) *Attorney, Agent, or Firm*—Crompton, Seager & Tufte, LLC

(57) ABSTRACT

A security control system for improving security. The security control system includes a portable device, having a communication function and a portable device ID code. A security controller includes a memory for recording a controller ID code. The security controller communicates with the portable device and determines whether the portable device ID code matches the controller ID code. In accordance with the determination, the security controller selectively deactivates the security functions of a door lock driver and an engine controller. The security controller records and registers the portable device ID code as the controller ID code in the memory and transmits a registration signal containing the portable device ID code. A portable device management apparatus receives the registration signal from the security controller and manages the portable device based on the registration signal.

17 Claims, 5 Drawing Sheets

SECURITY CONTROL SYSTEM FOR MANAGING REGISTRATION OF ID CODES FOR PORTABLE DEVICES

BACKGROUND OF THE INVENTION

The present invention relates to a security control system, a security controller, a portable device management apparatus, and a security control method used in, for example, vehicles or houses.

Typically, security equipment such as door locks for vehicles or houses is operated by a user using an exclusive mechanical key. Using such security equipment, however, there is a risk of the mechanical key being fraudulently copied or the lock being picked. This would result in unauthorized operation of the security equipment.

In the prior art, a security control system employing electronic verification for enhancing the security level of security equipment has been proposed.

Japanese Laid-Open Patent Publication Nos. 2001-289142 and 2001-311333 describe examples of a vehicle security control system designed to perform radio communication between a portable device carried by a user and a security controller installed in a vehicle. Specifically, the portable device transmits to the security controller an ID code signal containing a unique ID code assigned to the portable device. Upon receipt of the ID code signal, the security controller compares the ID code contained in the ID code signal with an ID code registered beforehand in the security controller. If the two ID codes match, the security controller unlocks the door or enables the engine to be started. In other words, the security controller is designed to deactivate the security of security equipment on the condition that the ID code of the portable device matches with the ID code registered in the security controller. Therefore, a third party who does not have the portable device corresponding to the vehicle will not be able to deactivate the security. This enhances the security level of the security equipment.

In such a vehicle security control system, the ID code for the portable device needs to be registered beforehand in the vehicle security controller. Therefore, if the user wants to register an additional portable device as a spare key, the user must perform an ID registration operation to register the ID code of the additional portable device. In general, such an ID registration operation involves a predetermined operation for switching the security controller to an ID registration mode so that the security controller performs communication for registering the portable device. Therefore, when an automobile dealer performs such an ID registration operation, for example, only certain people are allowed to know the procedures for switching the security controller to the ID registration mode.

The security controllers for vehicles in the prior art exhibit a superior anti-theft effect as long as they are used in ordinary circumstances. However, a third party, who knows the procedures for registering a portable device ID code, may be able to fraudulently register the ID code of a portable device. Thus, the vehicle security control system of the prior art cannot always provide sufficient anti-theft effect in such special cases.

SUMMARY OF THE INVENTION

It is an object of the present invention to provide a security control system, a security controller, a portable device management apparatus, and a security control method for further improving the security level of security equipment.

One aspect of the present invention is a security control system for controlling a security device provided with a security function. The system includes a portable device provided with a communication function and having a portable device ID code. A security controller, which includes a recording unit for recording a controller ID code, communicates with the portable device to determine whether the portable device ID code matches the controller ID code, selectively deactivates the security function of the device in accordance with the determination result, records the portable device ID code in the recording unit to register the portable device ID code as the controller ID code, and transmits a registration signal containing the portable device ID code. A portable device management apparatus receives the registration signal from the security controller and manages the portable device in accordance with the received registration signal.

Another aspect of the present invention is a security controller for use with a portable device, having a portable device ID code, and a portable device management apparatus, for managing the portable device. The security controller controls a security device provided with a security function. The security controller includes a portable device communication unit for communicating with the portable device. A recording unit records a controller ID code corresponding to the portable device ID code. A security communication unit communicates with the portable device management apparatus. A control unit is connected to the portable device communication unit, the recording unit, and the security communication unit. The control unit communicates with the portable device to determine whether the portable device ID code matches the controller ID code and selectively deactivates the security function of the security device based on a determination result. The control unit records the portable device ID code in the recording unit to register the portable device ID code as the controller ID code and has the security communication unit transmit a registration signal containing the portable device ID code to the portable device management apparatus.

A further aspect of the present invention is a portable device management apparatus for use with a portable device, having a portable device ID code, and a security controller, having a controller ID code. The security controller communicates with the portable device to determine whether the portable device ID code matches the controller ID code, selectively deactivates a security function of a security device based on the determination result, registers the portable device ID code as the controller ID code in the security controller, and transmits a registration signal containing the portable device ID code to the portable device management apparatus. The portable device management apparatus includes a management communication unit for receiving the registration signal from the security controller. A management control unit, connected to the management communication unit, manages the portable device based on the portable device ID code contained in the registration signal.

Another aspect of the present invention is a security control method for use with a portable device, having a portable device ID code, a security controller, having a controller ID code, and a portable device management apparatus. The security controller communicates with the portable device to determine whether the portable device ID code matches the controller ID code, and selectively deactivates a security function of a security device based on the determination result. The method includes registering the portable device ID code as the controller ID code in the security controller, transmitting a registration signal containing the portable device ID code that is to be registered from the security controller to the portable device management apparatus, and managing a portable device corresponding to the portable device ID code contained in the registration signal with the portable device management apparatus.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A vehicle security control system 1 according to a first embodiment of the present invention will now be described with reference to FIGS. 1 and 2.

Figure 1:
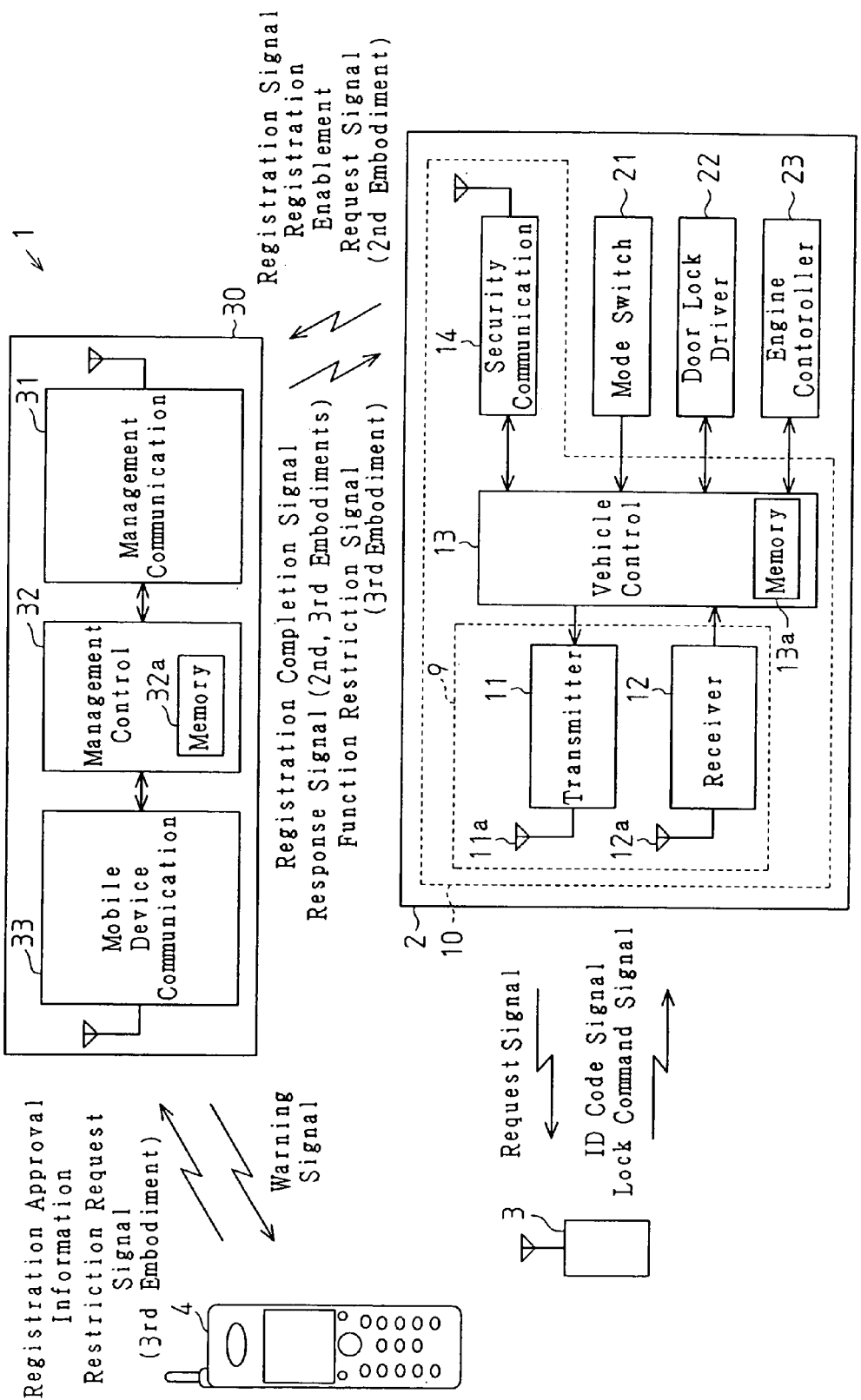
FIG. 1 is a block diagram schematically showing a vehicle security control system according to first to third embodiments of the present invention.

As shown in FIG. 1, the vehicle security control system 1 includes a portable device 3 carried by a user (owner) of a vehicle 2, a security controller 10 installed in the vehicle 2, and a portable device management apparatus 30 arranged outside of (separately from) the vehicle 2.

The portable device 3 records a preset ID code and is provided with a communication function. The security controller 10 transmits a request signal. When receiving the request signal from the security controller 10, the portable device 3 transmits an ID code signal containing an ID code. The portable device 3 has an operation unit. When the operation unit is operated, the portable device 3 transmits a lock command signal containing an ID code and a lock code or an unlock code.

The security controller 10 has a transmitter circuit 11, a receiver circuit 12, a vehicle control unit 13, and a security communication unit 14. The transmitter circuit 11 and the receiver circuit 12 form a portable device communication unit 9. The transmitter circuit 11, the receiver circuit 12, and the security communication unit 14 are electrically connected to the vehicle control unit 13.

The vehicle control unit 13 provides a request signal to the transmitter circuit 11. The transmitter circuit 11 converts the request signal to radio waves of a predetermined frequency (134 kHz in this embodiment). Then, the transmitter circuit 11 transmits the radio waves, via a transmission antenna 11a, selectively to a predetermined area around the vehicle 2 and to the passenger compartment of the vehicle 2.

The receiver circuit 12 receives the ID code signal and the lock command signal transmitted by the portable device 3 via a receiver antenna 12a. Then, the receiver circuit 12 demodulates the received signal to a pulse signal before providing the signal to the vehicle control unit 13.

The security communication unit 14 is designed to be able to communicate with a portable device management apparatus 30 which transmits a transmission signal. The vehicle control unit 13 provides a registration signal to the security communication unit 14. The security communication unit 14 modulates the registration signal to radio waves with a predetermined frequency, and transmits the radio waves to the portable device management apparatus 30. When receiving a transmission signal from the portable device management apparatus 30, the security communication unit 14 demodulates the transmission signal to a pulse signal before providing the demodulated signal to the vehicle control unit 13.

The vehicle control unit 13 has a CPU, a ROM, a RAM (none of which are shown), and a nonvolatile memory 13a, which functions as a recording unit. The memory 13a records one or more ID codes assigned to the portable device 3.

The vehicle control unit 13 is electrically connected to a mode switch 21, a door lock driver 22, and an engine controller 23.

The mode switch 21 is located in the passenger compartment of the vehicle 2 and operated by a user. When operated by the user, the mode switch 21 provides an operation signal to the vehicle control unit 13.

The door lock driver 22 is connected to an actuator (not shown). The vehicle control unit 13 provides a drive signal to the door lock driver 22. In response to the drive signal, the door lock driver 22 drives the actuator to lock or unlock a door. The door lock driver 22 provides, to the vehicle control unit 13, a lock signal indicating whether the door is locked or unlocked. The vehicle control unit 13 recognizes whether the door is locked or unlocked based on the lock signal.

The engine controller 23 is connected to a starter motor (not shown). The vehicle control unit 13 provides a start signal to the engine controller 23. In response to the start signal, the engine controller 23 drives the starter motor and, at the same time, performs fuel injection control and ignition control to start the engine. The engine controller 23 provides to the vehicle control unit 13 a drive state signal indicating the drive state of the engine. The vehicle control unit 13 recognizes the drive state of the engine based on the drive state signal.

The vehicle control unit 13 is provided with a security control mode, for controlling the door lock driver 22 and the engine controller 23, and an ID registration mode, for recording (registering) an ID code assigned to the portable device 3 in the memory 13a. The vehicle control unit 13 is normally set to the security control mode and set to the ID registration mode when receiving an operation signal from the mode switch 21.

In the security control mode, the vehicle control unit 13 intermittently provides a request signal to the transmitter circuit 11. The transmitter circuit 11 transmits the request signal, via the transmission antenna 11a, selectively to a predetermined area around the vehicle 2 or to the passenger compartment of the vehicle 2. When receiving the ID code signal or the lock command signal from the receiver circuit 12, the vehicle control unit 13 compares the ID code contained in the received signal with the ID code recorded in the memory 13a (ID code authentication). If the two ID codes match or if the authentication of the ID code is established, the vehicle control unit 13 drives the door lock driver 22 or the engine controller 23.

More specifically, when receiving an ID code signal in response to a request signal transmitted to the predetermined area around the vehicle 2, the vehicle control unit 13 provides a drive signal to the door lock driver 22 to unlock the door. When the ID code signal is no longer provided to the vehicle control unit 13, the vehicle control unit 13 provides a drive signal to the door lock driver 22 to lock the door.

When receiving an ID code signal in response to a request signal transmitted to the passenger compartment of the vehicle 2, the vehicle control unit 13 is set to an engine start stand-by state. A start switch (not shown) is arranged in the vicinity of the driver's seat in the passenger compartment of the vehicle 2 and is electrically connected to the vehicle control unit 13. When the vehicle control unit 13 receives an operation signal from the start switch in the engine start stand-by state, the vehicle control unit 13 provides a start signal to the engine controller 23 to start the engine. This means that when the vehicle control unit 13 is not in the engine start stand-by state, the vehicle control unit 13 will not provide a start signal to the engine controller 23 even if receiving an operation signal from the start switch.

When receiving a lock command signal containing a lock code, the vehicle control unit 13 locks the door. When receiving a lock command signal containing an unlock code, the vehicle control unit 13 unlocks the door.

In this manner, when in the security control mode, the security controller 10 controls the security of the door lock driver 22 and the engine controller 23 based on whether the authentication of the ID code involving the use of the portable device 3 has been established or not.

When switched from the security control mode to the ID registration mode, the vehicle control unit 13 intermittently provides a request signal to the transmitter circuit 11 and communicates with the portable device 3 in the same manner as in the security control mode. When receiving an ID code signal from the receiver circuit 12, the vehicle control unit 13 records an ID code contained in the ID code signal in the memory 13a. After completing the recording, the vehicle control unit 13 provides a registration signal containing the ID code and the vehicle information to the security communication unit 14. The registration signal is transmitted to the portable device management apparatus 30 by the security communication unit 14 (registration communication control). The vehicle information is information for identifying the vehicle 2. In the first embodiment, the vehicle information includes at least one of chassis number, vehicle number, and dealer information (e.g. the store identification number or password uniquely assigned to the dealer).

The portable device management apparatus 30 is arranged in, for example, an exclusive management center and includes a management communication unit 31, a management control unit 32, and a mobile device communication unit 33. The management control unit 32 is electrically connected to the management communication unit 31 and the mobile device communication unit 33.

The management communication unit 31 communicates with the security communication unit 14 in the security controller 10. When receiving a registration signal from the security communication unit 14, the management communication unit 31 demodulates the registration signal and provides the demodulated signal to the management control unit 32.

The mobile device communication unit 33 communicates with a mobile device (cellular phone 4 in this embodiment) carried by the user. The mobile device communication unit 33 receives a warning signal from the management control unit 32 and transmits the warning signal to the cellular phone 4 by using a public communication network.

The management control unit 32 is a computer unit including a CPU, a ROM, and a RAM (none of which are shown), and a non-volatile memory 32a.

The memory 32a records vehicle information of the vehicle 2 set as the management subject, registration approval information that is set in association with the vehicle information, and the ID code recorded in the memory 13a of the security controller 10. More specifically, the memory 32a records the vehicle information including the chassis number, the vehicle number, the dealer information (e.g. the store identification number or password uniquely assigned to the dealer) of the vehicle 2, device information of the cellular phone 4 (e.g., telephone number and e-mail address), and other information for identifying the vehicle 2.

The registration approval information, which indicates whether or not the registration of the ID code is approved, is transmitted from the cellular phone 4. The registration approval information may be set by the user. Specifically, the registration approval information is formed by a code combination having a predetermined number of digits. The code combination is obtained by binary-converting a code combination input with the numeric keys of the cellular phone 4. More specifically, the registration approval information includes a registration approval code for approving the registration of the ID code or a registration disapproval code for disapproving the registration of the ID code. The registration approval code and the registration disapproval code respectively correspond to combination codes set by the user. The user is allowed to randomly set a code combination as the registration approval code and another code combination as the registration disapproval code. In the first embodiment, the cellular phone 4 transmits the registration approval information to the portable device management apparatus 30 when a predetermined operation is performed (for example, when a telephone number or a predetermined command is input to the portable device management apparatus 30).

In the memory 32a, there is a recording region for the ID code and a recording region for the registration approval information in association with vehicle information. For example, when vehicle information A and vehicle information B for two vehicles 2 are recoded in the memory 32a, the recording regions for the ID code and registration approval information corresponding to the vehicle information A are set separately from the recording regions for the ID code and registration approval information corresponding to the vehicle information B. A plurality of ID codes can be recorded in an ID code recording region. The number of ID codes that can be recorded in a recording region may either be preset or be set by the user. A registration number is assigned to each of the ID codes recorded in the recording region, for example, in accordance with the recorded order.

The management control unit 32 receives registration approval information from the cellular phone 4 via the mobile device communication unit 33 and records the registration approval information in the memory 32a. Whenever receiving registration approval information, the management control unit 32 updates the registration approval information (rewrites the registration approval information on the memory 32a).

When receiving a registration signal from the management communication unit 31, based on the vehicle information contained in the registration signal, the management control unit 32 checks the recording region where the corresponding registration approval information and the corresponding ID code are recorded. If the corresponding registration approval information is a registration approval code and there is space in the recording region for the corresponding ID code, then the management control unit 32 records the ID code contained in the registration signal in that space. In other words, the management control unit 32 determines that the registration of the ID code is appropriate. The management control unit 32 transmits a registration completion signal indicating that the registration has been completed to the security controller 10 via the management communication unit 31. If there is no space in the recording region for the ID code corresponding to the vehicle information or if the corresponding registration approval information is a registration disapproval code, then the management control unit 32 determines that there is an anomaly in the ID code registration. In other words, the management control unit 32 determines that the registration of the ID code is inappropriate. The management control unit 32 provides a warning signal indicating that there is an anomaly in the registration to the mobile device communication unit 33. The mobile device communication unit 33 transmits the warning signal to the cellular phone 4.

A communication mode implemented by the vehicle security control system 1 to register an ID code for the portable device 3 in the security controller 10 will now be described with reference to the sequence chart shown in FIG. 2.

First, the user operates the mode switch 21 of the security controller 10 (step S1). The security controller 10 is thereby switched from the security control mode to the ID registration mode (step S2). When switched to the ID registration mode, the security controller 10 transmits a request signal to the passenger compartment of the vehicle 2 (step S3).

When receiving the request signal, the portable device 3 transmits an ID code signal (step S4).

When receiving the ID code signal from the portable device 3, the security controller 10 records the ID code contained in the ID code signal in the memory 13a (step S5). That is, the security controller 10 registers the acquired ID code of the portable device 3. Subsequently, the security controller 10 transmits a registration signal to the portable device management apparatus 30 (step S6).

When receiving the registration signal from the security controller 10, based on the vehicle information contained in the registration signal, the portable device management apparatus 30 determines whether or not registration of the ID code in the corresponding security controller 10 is approved (step S7). In other words, the portable device management apparatus 30 determines whether or not the registration approval information corresponding to the vehicle information that the user has preset by means of the cellular phone 4 is a registration approval code. Further, the portable device management apparatus 30 finds an ID code recording region in the memory 32a and determines whether or not the ID code contained in the registration signal can be recorded in the recording region (also step S7). In other words, the portable device management apparatus 30 determines in this step whether there is an area in the recording region where the ID code can be registered. If it is determined that the corresponding registration approval information is a registration approval code, and the memory 32a has space in the recording region for the ID code corresponding to the vehicle information, the portable device management apparatus 30 then determines that the registration of the ID code is appropriate and records the acquired ID code in the space (step S8). Subsequently, the portable device management apparatus 30 transmits a registration completion signal to the security controller 10 (step S9). In this manner, the portable device management apparatus 30 is capable of managing the portable device 3 corresponding to the vehicle 2 based on the registered ID code.

When receiving a registration completion signal from the portable device management apparatus 30, the security controller 10, for example, has an indicator (not shown) provided in the passenger compartment of the vehicle 2 display a message indicating that the registration has been completed or has a speaker (not shown) generate an audible announcement indicating that the registration has been completed (step S10). In this manner, the user may confirm that the portable device 3 has been registered.

If it is determined in step S7 that the registration approval information corresponding to the vehicle information is a registration disapproval code or that there is no space where the ID code can be recorded in the corresponding recording region for the ID code, the portable device management apparatus 30 determines that the registration of the ID code is not appropriate and transmits a warning signal to the cellular phone 4 (step S11). A message is displayed on the cellular phone 4 indicating anomaly in the ID code registration. Therefore, when a third party fraudulently attempts to register an ID code, for example, the user is quickly informed of such attempt even if the user is separated from the vehicle.

The security control system 1 of the first embodiment has the advantages described below.

(1) The security controller 10 controls the security of the door lock driver 22 and the engine controller 23 based on whether or not authentication of the ID code with the portable device 3 has been established. In order to establish ID code authentication with the portable device 3 and the security controller 10, ID registration must be performed by recording the ID code of the portable device 3 in the memory 13a of the security controller 10. When ID registration is performed, a registration signal containing an ID code that is to be registered is transmitted from the security controller 10 to the portable device management apparatus 30. When receiving the registration signal, the portable device management apparatus 30 records the ID code contained in the registration signal in the memory 32a of the management control unit 32 and manages the corresponding portable device 3 based on the recorded ID code. Therefore, if an ID code of the portable device 3 is fraudulently registered in the security controller 10, the portable device management apparatus 30 is capable of recognizing such fraudulent registration. As a result, fraudulent ID code registration by a third party is effectively prevented. This further improves the security level.

(2) When registration approval information that is a registration disapproval code is recorded in the memory 32a of the management control unit 32, the portable device management apparatus 30 disapproves registration of an ID code in the security controller 10 (registration disapproval state). When receiving a registration signal from the security controller 10 in the registration disapproval state, the portable device management apparatus 30 determines that an ID code has been fraudulently registered and notifies the cellular phone 4 of such fraudulent registration. Therefore, even if the user is separated from the vehicle 2, the user is quickly informed through the cellular phone 4 that an ID code has been fraudulently registered. Accordingly, the user may quickly cope with the fraudulent registration. As a result, the security level is further improved.

(3) When the user inputs a code combination to the cellular phone 4, registration approval information is transmitted from the cellular phone 4 to the portable device management apparatus 30. The portable device management apparatus 30 is switched between the ID code registration approval state and the ID code registration disapproval state according to the registration approval information. In other words, the user is allowed to select whether the portable device management apparatus 30 is set to the ID code registration approval state or to the registration disapproval state. Therefore, the user can set the portable device management apparatus 30 to the registration approval state only when, for example, registering an ID code. As a result, the security level is improved even further.

(4) When the registration of the ID code in the security controller 10 and the portable device management apparatus 30 has been completed, an indicator provided in the passenger compartment of the vehicle 2 displays a message indicating the completion of the ID code registration. Therefore, the user can confirm completion of the ID code registration by viewing the indicator.

Second Embodiment

Figure 3:
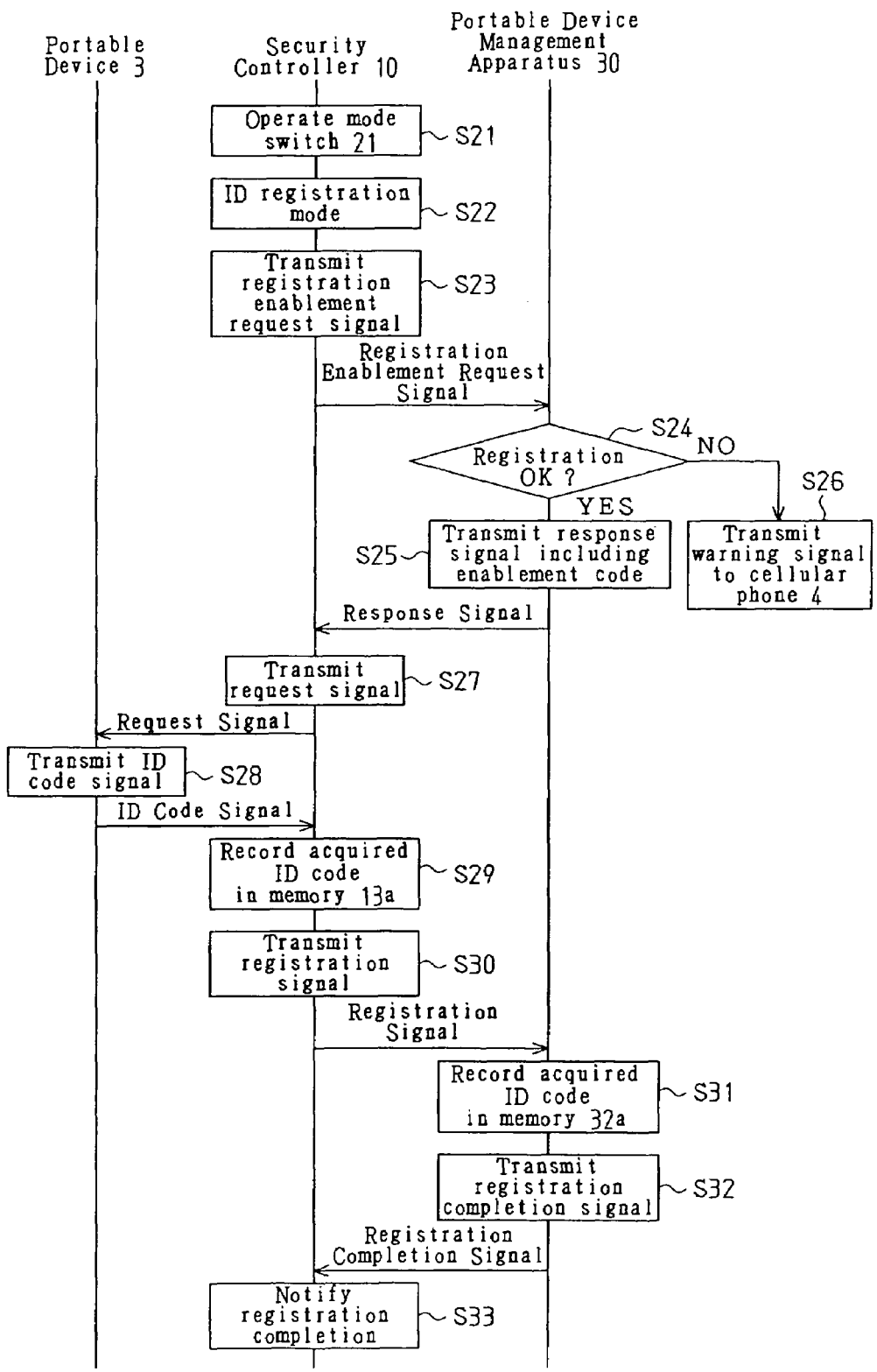
FIG. 3 is a sequence chart illustrating a communication mode according to the second embodiment.

A vehicle security control system 1 according to a second embodiment of the present invention will now be described with reference to FIGS. 1 and 3.

The second embodiment differs from the first embodiment in the mode of control implemented by the vehicle control unit 13 of the security controller 10 and the management control unit 32 of the portable device management apparatus 30 and in the communication mode implemented by the vehicle security control system 1 when an ID code of the portable device 3 is registered in the security controller 10 (during ID registration control). The hardware of the portable device 3, the security controller 10, and the portable device management apparatus 30 of the first embodiment are used in the second embodiment.

The control implemented by the vehicle control unit 13 and the management control unit 32 will first be described.

In the security control mode, the vehicle control unit 13 performs the same control as in the first embodiment. When the mode switch 21 is switched from the security control mode to the ID registration mode, the vehicle control unit 13 provides a registration enablement request signal containing vehicle information to the security communication unit 14. The security communication unit 14 transmits the registration enablement request signal to the portable device management apparatus 30 (see FIG. 1).

When receiving a response signal from the security communication unit 14 after transmitting the registration enablement request signal, the vehicle control unit 13 determines whether or not the response signal contains an enablement code. If the vehicle control unit 13 determines that the response signal contains an enablement code, then the vehicle control unit 13 intermittently provides a request signal to the transmitter circuit 11 and communicates with the portable device 3 in the same manner as in the first embodiment. When receiving an ID code signal transmitted by the portable device 3 from the receiver circuit 12, the vehicle control unit 13 records the ID code contained in the ID code signal in the memory 13a. Upon completion of the recording, the vehicle control unit 13 provides the security communication unit 14 with a registration signal containing the ID code and the vehicle information and transmits the registration signal to the portable device management apparatus 30 via the security communication unit 14.

If the vehicle control unit 13 does not receive a response signal containing an enablement code from the security communication unit 14, then the vehicle control unit 13 disables communication with the portable device 3 in the ID registration mode and at the same time has an indicator (not shown) located in the passenger compartment of the vehicle 2 display a message indicating that the ID code registration is disabled. Therefore, in the state in which the ID code registration is disabled by the portable device management apparatus 30, a new ID code cannot be recorded in the memory 13a of the vehicle control unit 13. The user may confirm that registration is disabled by viewing the indicator.

When receiving a registration enablement request signal from the security controller 10, the management control unit 32 determines (verifies) whether the registration approval information corresponding to the vehicle information contained in the registration enablement request signal is a registration approval code and whether there is space in the recording region for the corresponding ID code. When verified, the management control unit 32 transmits a response signal containing an enablement code to the security controller 10 via the management communication unit 31 (see FIG. 1). If not verified, that is, if there is no space in the recording region for the ID code corresponding to the vehicle information or if the registration approval information is a registration disapproval code, then the management control unit 32 does not transmit a response signal. In this case, the management control unit 32 determines that there is an anomaly in the ID registration and provides a warning signal to the mobile device communication unit 33. The mobile device communication unit 33 transmits the warning signal to the cellular phone 4.

When receiving a registration signal from the security controller 10 via the management communication unit 31, the management control unit 32 records the ID code contained in the registration signal in a space. The management control unit 32 transmits a registration completion signal indicating that the registration has been completed to the security controller 10 via the management communication unit 31.

A communication mode implemented by a vehicle security control system 1 in the second embodiment during ID registration control will now be described with reference to the sequence chart shown in FIG. 3.

First, the user operates the mode switch 21 of the security controller 10 (step S21). The security controller 10 is thereby switched from the security control mode to the ID registration mode (step S22). Upon being switched to the ID registration mode, the security controller 10 transmits a registration enablement request signal to the portable device management apparatus 30 (step S23).

When receiving the registration enablement request signal, the portable device management apparatus 30 determines (verifies), based on the vehicle information contained in the registration enablement request signal, whether registration of the ID code in the corresponding security controller 10 is approved or not (step S24). In other words, the portable device management apparatus 30 determines whether or not the registration approval information corresponding to the vehicle information is a registration approval code. The portable device management apparatus 30 finds a recording region for the ID code in the memory 32a and determines whether or not the ID code can be newly recorded in the recording region (also step S24). This means that, in this step, the portable device management apparatus 30 determines whether or not there is space in the recording region where an additional ID code may be recorded. If it is determined that the corresponding registration approval information is a registration approval code and that there is space in the recording region for the ID code corresponding to the vehicle information in the memory 32a, the portable device management apparatus 30 determines that the registration of the ID code is appropriate and transmits a response signal containing an enablement code to the security controller 10 (step S25).

If the registration approval information corresponding to the vehicle information is a registration disapproval code or if there is no space available for recording the ID code in the corresponding ID recording region, the portable device management apparatus 30 then determines that the registration of the ID code is not appropriate and does not transmit a response signal containing an enablement code to the security controller 10. In this case, the portable device management apparatus 30 transmits a warning signal to the cellular phone 4 (step S26). Thus, a message is shown on the cellular phone 4 indicating that there is an anomaly in the ID code registration. Accordingly, if the security controller 10 is switched to the ID registration mode against the user's will, for example, by a fraudulent operation of a third party, the user quickly recognizes the transition to the ID registration mode even when separated from the vehicle. Thus, in the second embodiment, the user is given a warning before the ID code of the portable device 3 is registered in the security controller 10. This prevents fraudulent ID code registration.

When receiving a response signal containing an enablement code from the portable device management apparatus 30, the security controller 10 transmits a request signal to the passenger compartment of the vehicle 2 (step S27).

When receiving this request signal, the portable device 3 transmits an ID code signal (step S28).

When receiving the ID code signal from the portable device 3, the security controller 10 records the ID code contained in the ID code signal in the memory 13a (step S29). In other words, the security controller 10 registers the ID code of the portable device 3 in the security controller 10. The security controller 10 then transmits a registration signal to the portable device management apparatus 30 (step S30).

Figure 2:
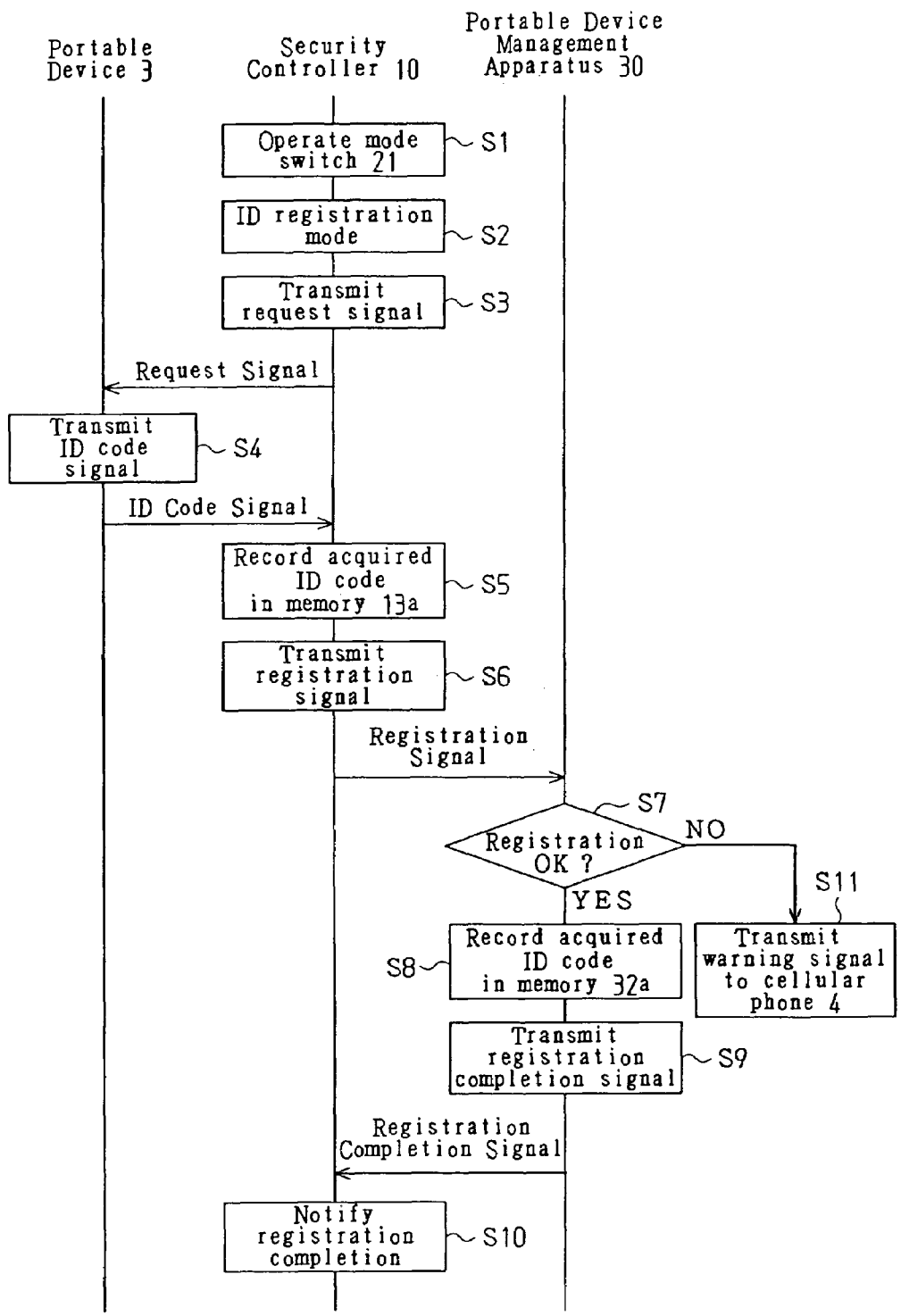
FIG. 2 is a sequence chart illustrating a communication mode according to the first embodiment.

The communications performed in steps S27 to S30 are equivalent to those in steps S3 to S6 of the first embodiment (see FIG. 2).

When receiving the registration signal from the security controller 10, the portable device management apparatus 30 records the ID code contained in the registration signal in open space of the recording region for the ID code corresponding to the vehicle information (step S31). The portable device management apparatus 30 transmits a registration completion signal to the security controller 10 (step S32). The portable device management apparatus 30 manages the portable device 3 corresponding to the vehicle 2 based on the recorded ID code.

When receiving the registration completion signal from the portable device management apparatus 30, the security controller 10 has an indicator (not shown) arranged in the passenger compartment of the vehicle 2 display a message indicating the completion of the registration or has a speaker (not shown) generate an audible announcement of the completion of the registration (step S33). In this manner, the user is able to confirm the completion of the registration of the portable device 3.

As described above, in the second embodiment, the security controller 10 first communicates with the portable device management apparatus 30 when switched to the ID registration mode. Therefore, if the registration of an ID code is approved by the portable device management apparatus 30, the security controller 10 communicates with the portable device 3 to record (register) the ID code of the portable device 3 in the memory 13a. The security controller 10 then communicates again with the portable device management apparatus 30 so that the registered ID code is managed by the portable device management apparatus 30. Accordingly, an approval by the portable device management apparatus 30 is always required for registering an ID code of the portable device 3 with the security controller 10. Thus, fraudulent registration of a portable device 3 is prevented with higher reliability.

In addition to advantages (1), (3), and (4) of the first embodiment, the vehicle security control system 1 of the second embodiment has the advantages described below.

(5) During ID registration control, the portable device management apparatus 30 determines whether or not the registration of an ID code is appropriate. The security controller 10 is allowed to record the ID code in the memory 13a only when it is determined that the registration of the ID code is appropriate. This means that the security controller 10 cannot additionally record an ID code of a portable device 3 in the memory 13a unless the portable device management apparatus 30 provides approval to do so. As a result, fraudulent registration of an ID code is prevented further effectively, and the security level is further improved.

(6) When switched from the security control mode to the ID registration mode, the security controller 10 first requests registration approval for an ID code to the portable device management apparatus 30. If the registration is approved by the portable device management apparatus 30, the security controller 10 communicates with the portable device 3 to register the ID code of the portable device 3. If registration is not approved by the portable device management apparatus 30, the security controller 10 does not communicate with the portable device 3. This means that the communication between the security controller 10 and the portable device 3 is not performed if the ID code cannot be registered. Consequently, it is possible to avoid useless communication between the portable device 3 and the security controller 10. This decreases power consumption of both the portable device 3 and the security controller 10.

The vehicle security control system 1 of the second embodiment may be modified as described below.

Figure 4:
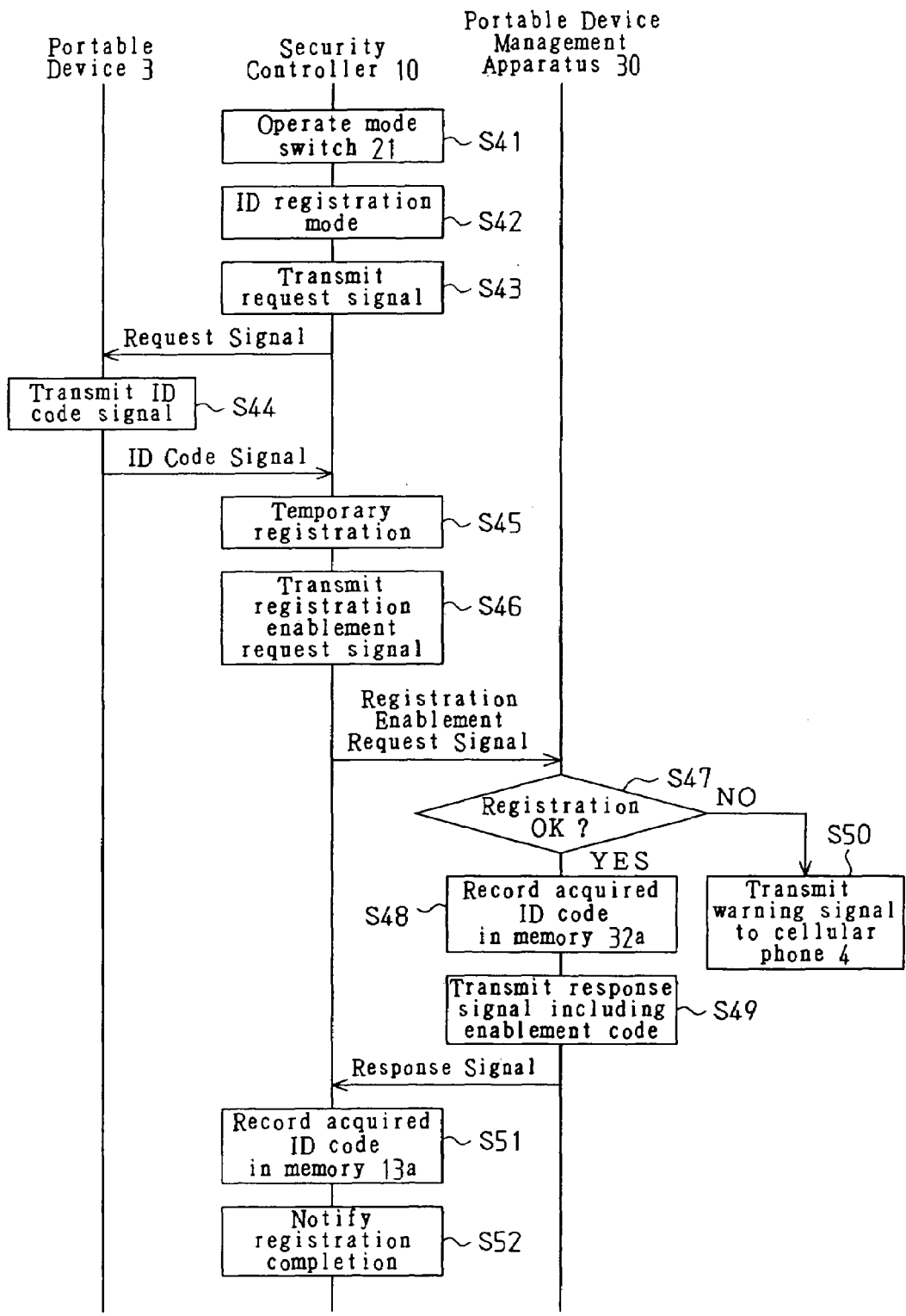
FIG. 4 is a sequence chart illustrating a modification of the communication mode according to the second embodiment.

When switched from the security control mode to the ID registration mode, the security controller 10 of the second embodiment first requests registration approval for an ID code to the portable device management apparatus 30. The security controller 10 communicates with the portable device 3 to register the ID code of the portable device 3 when the registration is approved by the portable device management apparatus 30. However, the ID registration control is not limited to such a communication mode and may be modified as shown in FIG. 4. This modification will now be described with reference to FIG. 4. In this modification, a registration enablement request signal transmitted from the vehicle control unit 13 of the security controller 10 contains vehicle information and an ID code of a portable device 3 that is to be registered.

First, the mode switch 21 of the security controller 10 is operated by the user (step S41). The security controller 10 is switched from the security control mode to the ID registration mode (step S42). When switched to the ID registration mode, the security controller 10 transmits a request signal to the passenger compartment of the vehicle 2 (step S43).

When receiving the request signal, the portable device 3 transmits an ID code signal (step S44).

When receiving the ID code signal from the portable device 3, the security controller 10 temporarily stores the ID code contained in the ID code signal in, for example, an RAM or buffer (temporary registration) (step S45). The security controller 10 then transmits a registration enablement request signal containing the temporarily stored ID code and the vehicle information to the portable device management apparatus 30 (step S46).

When receiving the registration enablement request signal, the portable device management apparatus 30 determines, based on the vehicle information contained in the registration enablement request signal, whether or not the registration of the ID code in the corresponding security controller 10 is approved (authentication) (step S47). The portable device management apparatus 30 further finds a recording region for the ID code in the memory 32a, and determines whether an additional ID code can be recorded in the recording region (also step S47). The portable device management apparatus 30 thus performs in this step the same processing as that performed in step S24 of the second embodiment. If the corresponding registration approval information is a registration approval code, and there is a space in the recording region for the ID code corresponding to the vehicle information in the memory 32a, then the portable device management apparatus 30 determines that the registration of the ID code is appropriate. The portable device management apparatus 30 records the ID code contained in the registration enablement request signal (obtained ID code) in the open space of the memory 32a (step S48). Thereafter, the portable device management apparatus 30 transmits a response signal containing an enablement code to the security controller 10 (step S49).

If the registration approval information corresponding to the vehicle information is a registration disapproval code or if there is no area available for registering the ID code in the corresponding ID code recording region, the portable device management apparatus 30 determines that the registration of the ID code is not appropriate (negative authentication) and does not transmit a response signal containing an enablement code to the security controller 10. In this case, the portable device management apparatus 30 transmits a warning signal to the cellular phone 4 (step S50). Thus, in the same manner as in the second embodiment, the user is informed of an attempt to register an ID code of the portable device 3 in the security controller 10. Thus, fraudulent registration of the ID code is effectively prevented.

When receiving a response signal containing an enablement code from the portable device management apparatus 30, the security controller 10 records the temporarily recorded ID code in the memory 13a (formal registration) (step S51). Subsequently, the security controller 10 has, for example, an indicator (not shown) arranged in the passenger compartment of the vehicle 2 display a message indicating completion of the registration or has a speaker or the like (not shown) generate an audible announcement of completion of the registration (step S52). Thus, the user is able to confirm completion of registration of the portable device 3.

As described above, in this modification, when switched to the ID registration mode, the security controller 10 temporarily registers the ID code before communicating with the portable device management apparatus 30. If the registration of the ID code is approved by the portable device management apparatus 30, then the security controller 10 records the temporarily recorded ID code of the portable device 3 in the memory 13a (formal registration). The security controller 10 again communicates with the portable device management apparatus 30 so that the registered ID code is managed by the portable device management apparatus 30. Accordingly, approval of the portable device management apparatus 30 is always required for registering an ID code of a portable device 3 in the security controller 10. Thus, fraudulent registration of a portable device 3 is prevented more effectively.

When a registration enablement request signal containing the ID code of a portable device 3 is received by the portable device management apparatus 30 and the portable device management apparatus 30 approves registration of the ID code, the ID code is recorded in the memory 32a. Accordingly, communication between the security controller 10 and the portable device management apparatus 30 is not required to be performed twice as in the second embodiment and needs only to be performed once.

In addition to the advantage (5), the vehicle security control system 1 modified as described above has an advantage in that the communication mode of the vehicle security control system 1 during ID registration control is more simple than that of the second embodiment.

Third Embodiment

A vehicle security control system 1 according to a third embodiment of the present invention will now be described with reference to FIGS. 1 and 5.

The vehicle security control system 1 of the third embodiment implements security deactivation restriction control in addition to the control implemented in the first or second embodiment. Specifically, the vehicle security control system 1 of the third embodiment implements security deactivation restriction control in combination with the ID registration control of the first or second embodiments. The security deactivation restriction control implemented by the vehicle security control system 1 of the third embodiment will now be described in detail.

In the third embodiment, the cellular phone 4 transmits a restriction request signal to the portable device management apparatus 30 if a restriction operation is performed by the user (see FIG. 1). The cellular phone 4 determines that the restriction operation has been performed by the user when the user inputs a function restriction code number with the numeric keypads. The cellular phone 4 then transmits a restriction request signal containing a function restriction security code to the portable device management apparatus 30. If a portable device designation number designating the portable device 3 is input by the numeric keypads together with the function restriction code number, the cellular phone 4 transmits a restriction request signal containing the function restriction security code and the portable device designation code to the portable device management apparatus 30. The function restriction security code is obtained by binary-converting the function restriction code number. The portable device designation number refers to a registration number of the ID code recorded in the memory 32a of the portable device management apparatus 30, and the portable device designation code is obtained by binary-converting the portable device designation number.

When receiving a restriction request signal from the cellular phone 4, the portable device management apparatus 30 performs restriction command control for transmitting a function restriction signal to the security controller 10.

More specifically, the mobile device communication unit 33 of the portable device management apparatus 30 receives a restriction request signal. The mobile device communication unit 33 thus functions as a reception unit for receiving a restriction request signal. The restriction request signal is provided to the management control unit 32. When receiving the restriction request signal, the management control unit 32 determines whether there is a function restriction security code in the memory 32a that is corresponding to the function restriction security code contained in the restriction request signal (determination of the presence of the security code).

The function restriction security code is recorded in the memory 32a during vehicle registration control. The vehicle registration control is performed by registering vehicle information of a vehicle 2 in the portable device management apparatus 30 in order to set the vehicle 2 as the subject that is to be managed by the portable device management apparatus

30. In the first and second embodiments, the vehicle registration control is performed in the same manner. In the third embodiment, during such vehicle registration control, the function restriction security code is transmitted together with the vehicle information from the security controller 10 to the portable device management apparatus 30 and recorded in the memory 32a in a state associated with the vehicle information. Having recorded the vehicle information and the function restriction security code in the memory 32a through the vehicle registration control, the portable device management apparatus 30 transmits a vehicle registration completion signal indicating completion of the vehicle registration to the security controller 10.

If it is determined that the memory 32a includes a function restriction security code corresponding to the function restriction security code contained in the restriction request signal, then the management control unit 32 specifies the vehicle 2 that is to be controlled by the restriction command control based on the vehicle information corresponding to the function restriction security code. The management control unit 32 transmits a function restriction signal containing a function restriction code to the security controller 10 installed in the specified vehicle 2 via the management communication unit 31 (see FIG. 1). If the restriction request signal further contains a portable device designation code, the management control unit 32 reads an ID code associated with a registration number that matches the portable device designation code, from among the ID codes recorded in the memory 32a in association with the vehicle information. The management control unit 32 transmits a function restriction signal containing the read ID code and the function restriction code via the management communication unit 31.

When receiving a function restriction signal from the portable device management apparatus 30, the security controller 10 restricts or prohibits the driving of the door lock driver 22 or the engine controller 23 based on communication with the portable device 3 (function restriction processing).

More specifically, the security communication unit 14 of the security controller 10 receives a function restriction signal. The function restriction signal is then provided to the vehicle control unit 13. When receiving the function restriction signal, the vehicle control unit 13 determines whether or not the function restriction signal contains an ID code. If it is determined that no ID code is contained in the function restriction signal, the vehicle control unit 13 restricts or prohibits the control of the door lock driver 22 or the engine controller 23 even if the ID code of the portable device 3, which is able to communicate, is authenticated. In other words, the vehicle control unit 13 restricts or prohibits deactivation of security devices (the door lock driver 22 or the engine controller 23) even if the ID code of the portable device 3 corresponding to the ID code recorded in the memory 13a is authenticated. If the function restriction signal contains an ID code, the vehicle control unit 13 restricts or prohibits the control of the door lock driver 22 or the engine controller 23 only when the ID code of the portable device 3, which is corresponding to the ID code contained in the function restriction signal, is authenticated.

In the third embodiment, the vehicle control unit 13 implements the function restriction processing as described in the following (a) or (b). The user is allowed to select the processing that is to be performed.

(a) First Function Restriction Processing (Security Deactivation Prohibiting Processing)

(a-1) When the Function Restriction Signal Contains no ID Code

When receiving an ID code signal or lock command signal transmitted by a portable device 3 in response to a request signal, the vehicle control unit 13 does not drive the door lock driver 22 or the engine controller 23 even if the ID code contained in the ID code signal or the lock command signal is recorded in the memory 13a. That is, the vehicle control unit 13 prohibits the unlocking of the door or the startup of the engine even if the ID code of the portable device is authenticated. In other words, when receiving a function restriction signal, the vehicle control unit 13 prohibits the security deactivation operations, such as unlocking the door with the door lock driver 22 or enabling the starting of the engine with the engine controller 23.

(a-2) When the Function Restriction Signal Contains an ID Code

When receiving an ID code signal or lock command signal transmitted by a portable device 3 in response to a request signal, the vehicle control unit 13 first compares the ID code contained in the ID code signal or the lock command signal with the ID code contained in the function restriction signal. The vehicle control unit 13 does not drive the door lock driver 22 or the engine controller 23 when these two ID codes match. In other words, the vehicle control unit 13 prohibits security deactivation operations, such as unlocking the door or starting the engine, when the ID code of the portable device 3 matches the ID code contained in the function restriction signal. Accordingly, the vehicle control unit 13 performs a security deactivation operation when receiving an ID code signal or lock command signal containing an ID code not contained in the function restriction signal but recorded in the memory 13a. In other words, the attempt to deactivate security with a specific portable device 3 is prevented.

(b) Second Function Restriction Processing (Security Deactivation Restriction Processing)

(b-1) When the Function Restriction Signal Contains no ID Code

When receiving an ID code signal or a lock command signal transmitted by a portable device 3 in response to a request signal transmitted to the outside of the vehicle 2, the vehicle control unit 13 controls the door lock driver 22 to lock or unlock the door. However, when receiving an ID code signal transmitted by the portable device 3 in response to a request signal transmitted to the passenger compartment of the vehicle 2, the vehicle control unit 13 is not set to enable the starting of the engine. Therefore, even if the start switch is operated, the vehicle control unit 13 does not drive the engine controller 23. This means that when the ID code of the portable device 3 is authenticated, the vehicle control unit 13 locks or unlocks the door. However, the starting of the engine is prohibited. In other words, when receiving a function restriction signal, the vehicle control unit 13 restricts security deactivation operations.

(b-2) When the Function Restriction Signal Contains an ID Code

When receiving an ID code signal or lock command signal transmitted by a portable device 3 in response to a request signal transmitted to the outside of the vehicle 2, the vehicle control unit 13 also drives the door lock driver 22 to lock or unlock the door. That is, the vehicle control unit 13 locks or unlocks the door in the same manner as when the function restriction signal contains no ID code. However, if the vehicle control unit 13 receives, after receiving a function restriction signal containing an ID code, an ID code signal transmitted by the portable device 3 in response to a request signal transmitted to the passenger compartment of the vehicle 2, the vehicle control unit 13 first compares the ID code contained in the ID code signal with the ID code contained in the function restriction signal. The vehicle control unit 13 is not set to enable the starting of the engine when the ID code contained in the ID code signal matches the ID code contained in the function restriction signal. That is, if the ID code contained in the function restriction signal matches the ID code of the portable device 3, the vehicle control unit 13 locks or unlocks the door but prohibits the starting of the engine. In other words, when receiving a function restriction signal containing an ID code, the vehicle control unit 13 restricts security deactivation operations based on communication with the portable device 3 corresponding to the ID code contained in the function restriction signal. Accordingly, when receiving an ID code signal or lock command signal containing an ID code not contained in the function restriction signal but recorded in the memory 13*a* ( ), the vehicle control unit 13 performs security deactivation operations as usual. This means that security deactivation operations are restricted only when using a specific portable device 3.

When receiving a restriction release signal indicating that the restriction control is to be released, the vehicle control unit 13 releases the function restriction control to switch the control mode to the normal security control mode. More specifically, the user inputs a restriction release number to the cellular phone 4. The cellular phone 4 transmits a restriction release signal that is in accordance with the restriction release number to the portable device management apparatus 30. The portable device management apparatus 30 transmits the restriction release signal to the security controller 10. When receiving the restriction release signal, the security controller 10 is switched to the normal security control mode.

The security controller 10 is designed to be switched to the vehicle registration mode when a predetermined operation is performed. Specifically, when a vehicle registration shift switch (not shown) arranged in the vehicle 2 is operated, for example, a signal indicating such switch operation (vehicle registration shift signal) is provided to the vehicle control unit 13. When receiving the vehicle registration shift signal, the vehicle control unit 13 is switched to the vehicle registration mode and transmits a vehicle registration signal, containing vehicle information, to the portable device management apparatus 30 via the security communication unit 14. The vehicle control unit 13 is capable of receiving a signal input from an input device, such as an input unit of a car navigation system (not shown). After the vehicle control unit 13 is switched to the vehicle registration mode, a function restriction code number set by the user is input to the input device. When receiving an input signal including the function restriction code number from the input device, the vehicle control unit 13 transmits a vehicle registration signal containing the vehicle information and the function restriction security code to the portable device management apparatus 30 via the security communication unit 14. As a result, the vehicle information and the function restriction security code of the vehicle 2 are recorded in the memory 32*a* of the portable device management apparatus 30 in a state associated with each other.

When receiving a vehicle registration completion signal from the portable device management apparatus 30 via the security communication unit 14, the vehicle control unit 13 has an indicator (not shown) arranged in the passenger compartment of the vehicle 2 to display a message that the registration of the vehicle 2 has been completed.

In the vehicle security control system 1 of the third embodiment, a communication mode implemented during vehicle registration control in which vehicle information of the vehicle 2 is registered in the portable device management apparatus 30 so that the vehicle 2 is set as a subject that is to be managed by the portable device management apparatus 30 will now be described with reference to FIG. 5. A communication mode implemented during function restriction control will also be described.

Communication Mode During Vehicle Registration Control

Figure 5:
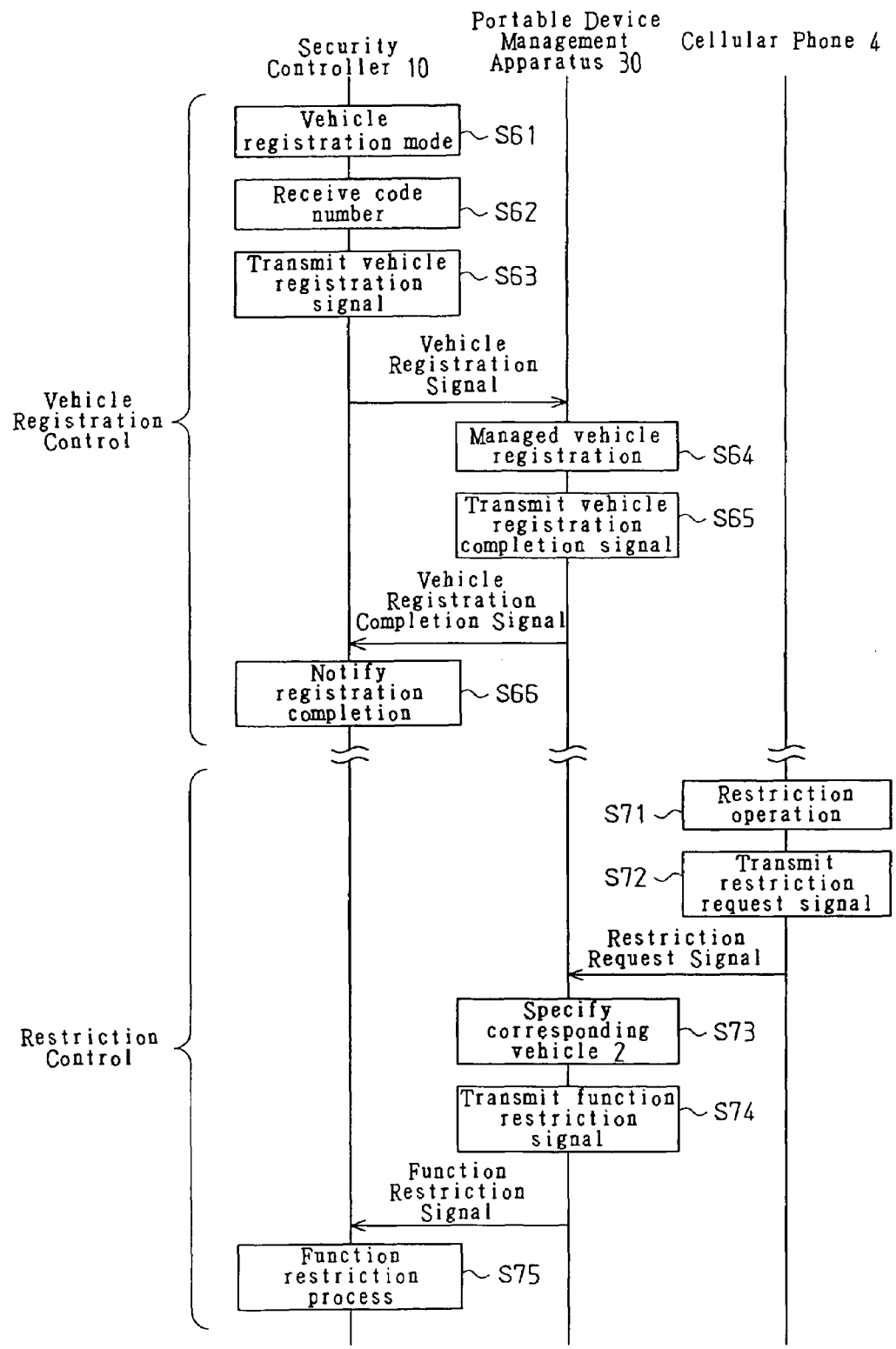
FIG. 5 is sequence chart illustrating a communication mode according to the third embodiment.

As shown in FIG. 5, registration of the vehicle 2 in the portable device management apparatus 30 is performed by communication between the security controller 10 and the portable device management apparatus 30.

More specifically, when a predetermined operation for shifting to the vehicle registration mode is performed, the security controller 10 is first switched to the vehicle registration mode (step S61). The security controller 10 receives a function restriction code number from the input device (step S62). The security controller 10 then transmits a vehicle registration signal containing vehicle information of the vehicle 2 and a function restriction security code to the portable device management apparatus 30 (step S63).

When receiving the vehicle registration signal from the security controller 10, the portable device management apparatus 30 records the vehicle information and the function restriction security code contained in the vehicle registration signal in the memory 32*a*, and thus completes the registration of the vehicle 2 as a management subject (managed vehicle registration) (step S64). Thus, the security controller 10 (vehicle 2) is registered as a management subject in the portable device management apparatus 30. The portable device management apparatus 30 transmits a vehicle registration completion signal indicating the completion of the vehicle registration to the security controller 10 (step S65).

When receiving the vehicle registration completion signal from the portable device management apparatus 30, the security controller 10 has the indicator display a message indicating that the registration of the vehicle 2 has been completed (step S66). Thus, the user is able to confirm that the registration of the vehicle 2 has been completed by viewing the indicator.

Communication Mode During Function Restriction Control

As shown in FIG. 5, the function restriction control is conducted by communication between the security controller 10, the portable device management apparatus 30, and the cellular phone 4.

More specifically, a function restriction code number is input to the cellular phone 4 to perform a restriction operation (step S71). The cellular phone 4 then transmits a restriction request signal containing a function restriction security code to the portable device management apparatus 30 (step S72). If the cellular phone 4 has received a portable device designation number together with the function restriction code number, the restriction request signal transmitted to the portable device management apparatus 30 contains the function restriction security code and the portable device designation code.

When receiving the restriction request signal, the portable device management apparatus 30 specifies a corresponding vehicle 2 based on the function restriction security code contained in the restriction request signal (step S73). The portable device management apparatus 30 transmits a function restriction signal containing a function restriction code to the security controller 10 provided in the specified vehicle 2 (step S74). If the restriction request signal received by the portable device management apparatus 30 contains a portable device designation code, then the portable device management apparatus 30 transmits a function restriction signal containing an ID code corresponding to the portable device designation code in addition to the function restriction code.

When receiving the function restriction signal from the portable device management apparatus 30, the security controller 10 implements the function restriction processing as described in (a) or (b) (step S75).

The vehicle security control system 1 of the third embodiment has the advantages described below.

(7) When receiving a restriction request signal from the mobile device (cellular phone 4) carried by a user, the portable device management apparatus 30 transmits a function restriction signal to the security controller 10. When receiving the function restriction signal, the security controller 10 prohibits or restricts the driving of the door lock driver 22 or the engine controller 23. This means that the security controller 10 prohibits or restricts the security deactivation operation by any device when receiving the function restriction signal. Therefore, if the user's portable device 3 has been lost or stolen, a restriction request signal can be transmitted from a cellular phone 4 to prohibit or restrict the security deactivation operation by the security controller 10. Accordingly, even if the portable device 3 is lost or stolen, it is possible to promptly prohibit or restrict the portable device 3 from conducting security deactivation operations, and thus a high security level is ensured.

(8) Security deactivation operations involving the use of the portable device 3 are easily prohibited or restricted by the user. This substantially lowers the value of the portable device 3 if stolen by a third party. Therefore, such portable device 3 would not be worthwhile stealing for any third party, and nobody would want to steal the portable device 3. Thus, the antitheft effect of the portable device 3 is also improved.

(9) If the user inputs a portable device designation number designating a portable device 3 when performing a restriction operation on a cellular phone 4, the security controller 10 prohibits or restricts only security deactivation involving communication with the designated portable device 3. In other words, when a restriction operation is performed with the cellular phone 4, security deactivation operations are prohibited or restricted for the specified portable device 3. Therefore, when a portable device 3 is lost or stolen, the user can prohibit or restrict the security deactivation operations performed by only that portable device 3, while allowing other registered portable devices 3 to perform normal security deactivation operations. In other words, portable devices 3 that are not lost or stolen can be used without any restrictions. Thus, security deactivation operations are not prohibited or restricted in portable devices 3 that required no function restriction. This ensures the convenience of the portable devices 3.

It should be apparent to those skilled in the art that the present invention may be embodied in many other specific forms without departing from the spirit or scope of the invention. Particularly, it should be understood that the present invention may be embodied in the following forms.

In the first embodiment, mutual authentication (pairing) may be performed between the vehicle control unit 13 and the security communication unit 14 in the security controller 10 for mutually determining whether these two units operate normally. The security controller 10 may be designed to approve the registration of the ID code of the portable device 3 only when it is determined that the two units operate normally, namely, when the mutual authentication is established. According to such arrangement, if the security communication unit 14 is wrongfully removed or broken, the mutual authentication will not be established, and hence the ID code cannot be registered in the security controller 10. Thus, fraudulent registration of an ID code can be prevented with higher reliability.

In the third embodiment, the portable device 3 may be provided with a GPS module. In such case, the position of the portable device 3 can be located by the portable device management apparatus 30 when function restriction is performed, and notification is sent to the cellular phone 4 from the portable device management apparatus 30. Therefore, even if a portable device 3 has been lost or stolen, the user is able to know the location of the portable device 3.

In the third embodiment, a restriction request signal is transmitted from the cellular phone 4 to the portable device management apparatus 30. Instead, the user may use the vehicle 2 to conduct the restriction operation, so that a restriction request signal is transmitted from the security controller 10 to the portable device management apparatus 30. This means that the function restriction for a device (e.g., the door lock driver 22 and the engine controller 23) may be performed by conducting the restriction operation with the use of the vehicle 2. According to this arrangement, mobile devices, such as the cellular phone 4, are not required for performing the function restriction.

In the third embodiment, the vehicle control unit 13 may be designed to prohibit the transmission of a request signal to the transmitter circuit 11 in the security control mode when receiving a function restriction signal containing no ID code in the security deactivation prohibiting processing. According to such modification, whenever a function restriction signal is provided to the vehicle control unit 13, communication between the security controller 10 and the portable device 3 is impossible in the security control mode. Therefore, no communication is established between the portable device 3 and the vehicle control unit 13, and the vehicle control unit 13 is prohibited from controlling the door lock driver 22 and the engine controller 23. Accordingly, it is possible to avoid useless communication between the portable device 3 and the security controller 10, and hence to decrease the power consumption of the portable device 3 and the security controller 10.

In the third embodiment, the portable device management apparatus 30 transmits a function restriction signal to the security controller 10. Instead, the portable device management apparatus 30 may transmit a function restriction signal to a portable device 3 whose function is to be restricted (a portable device 3 having an ID code corresponding to the function restricting ID code). In this case, the portable device 3 is designed to be able to communicate with the portable device management apparatus 30. Further, the portable device 3 is designed such that when receiving a function restriction signal from the portable device management apparatus 30, the portable device 3 cannot transmit an ID code signal or a lock command signal. This arrangement also disables security deactivation operations with the portable device 3 whose function is restricted, and the security level is further improved.

In the above embodiments, a vehicle registration signal is transmitted from the security controller 10 to the portable device management apparatus 30 when the vehicle registration control is implemented to set the vehicle 2 as a subject to be managed by the portable device management apparatus 30. Instead, a vehicle registration signal may be transmitted to the portable device management apparatus 30 from a registration device provided separately from the security controller 10 when such vehicle registration control is performed. For example, a personal computer may be used as the registration device so that a vehicle registration signal is transmitted from the personal computer to the portable device management apparatus 30. In this case, vehicle registration information such as vehicle information and function restriction code number is input to the personal computer, and a vehicle registration signal containing the vehicle registration information is transmitted to the portable device management apparatus 30 via a communication network such as the Internet. In this case, the security controller 10 (vehicle 2) is not always required for the vehicle registration, and hence the convenience of the vehicle registration is improved. Further, a password that is set by the user, the dealer, or the manufacturer of the portable device 3 may be assigned to the vehicle registration signal to prevent the vehicle from being fraudulently registered by a third party.

The vehicle registration signal may contain one or more ID codes for a portable device 3. In this case, when receiving the vehicle registration signal, the portable device management apparatus 30 records the ID codes contained in the signal in the memory 32a as registration ID codes associated with the vehicle information. When receiving a registration signal or a registration enablement request signal transmitted from the security controller 10, the portable device management apparatus 30 determines whether the ID code contained in the registration signal or registration enablement request signal matches with the registration ID code recorded in the memory 32a, and determines based on the result whether or not the registration of the ID code is appropriate. In this case, the portable device management apparatus 30 acknowledges only the registration ID codes obtained during the vehicle registration control as the ID codes that can be registered in the security controller 10. In this case, if a third party wrongfully attempts to register a portable device 3 having no registration ID code in the security controller 10, the portable device management apparatus 30 will determine that such registration is not appropriate and notify the cellular phone 4. This means that only a portable device 3 having an ID code that is set as a registration ID code can be registered in the security controller 10. Thus, fraudulent ID code registration by a third party is prevented, and the security level is further improved.

The procedure for registering a vehicle 2 in the portable device management apparatus 30 (vehicle registration procedure) and the procedure for registering an ID code of a portable device 3 in the security controller 10 (ID registration procedure) may be performed not only by the user but also by the dealer, the manufacturer of the portable device 3, or any other person that the user can trust.

The vehicle security control system 1 may be designed to perform only the security deactivation restriction control as described in the third embodiment, without performing the ID registration control as described in the first or second embodiment.

In the above embodiments, the communication between the security controller 10 and the portable device management apparatus 30 is not limited to radio communication but may also be, for example, wire communication employing a public communication line. For example, a connector for connecting a telephone modular jack may be provided in the vehicle 2, so that communication is performed between the security controller 10 and the portable device management apparatus 30 using a telephone line.

In the above embodiments, the mobile device is not limited to a cellular phone 4, but may be for example, a laptop personal computer, a Personal Digital Assistance (PDA), or a special communication device.

The vehicle security control system 1 of the above embodiments is provided with a function for automatically unlocking the door when the portable device 3 approaches the vehicle 2 (smart entry function) and with a function for starting the engine when the portable device 3 enters the passenger compartment of the vehicle 2 (smart ignition function). These functions are implemented by communication between the portable device 3 and the security controller 10. However, the vehicle security control system 1 may not be provided with such smart entry function or smart ignition function. For example, the portable device 3 may include a transponder and a mechanical key. The mechanical key communicates with the security controller 10 when arranged in the vehicle 2. The security controller 10 allows the mechanical key to be rotated if the communication with the transponder is established. If the mechanical key is rotated, the security controller 10 controls the door lock driver 22 or the engine controller 23. In other words, the only requirement is that the security controller 10 implements security deactivation operations based on communication with the portable device 3.

Such communication between the portable device 3 and the security controller 10 is not essential. For example, the portable device 3 may transmit only a lock command signal and, hence, the security controller 10 may not have a transmitter circuit 11 and may not transmit a request signal. In other words, the security controller 10 does not always have to perform communication with the portable device 3 as long as the security controller 10 performs security deactivation operations based on a transmission signal containing an ID code transmitted from the portable device 3.

In the above embodiments, the portable device management apparatus 30 manages the number of ID codes of portable devices 3 that can be registered in the security controller 10 provided in the vehicle 2 to be managed. However, the portable device management apparatus 30 does not always have to manage such number of ID codes.

In the above embodiments, whenever the security controller 10 is switched to the ID registration mode, the vehicle security control system 1 is capable of registering a portable device 3 irrespective of where the portable device 3 is. Instead, the vehicle security control system 1 may be modified, for example, such that a portable device 3 can be registered by the security controller 10 only when the portable device 3 is at a predetermined position (e.g., at home, an office, or the dealer) by connecting a GPS module to the security controller 10. According to such arrangement, fraudulent ID code registration by a third party is prevented with higher reliability, and the security level can be further improved.

In the above embodiments, the operation for switching the security controller 10 to the ID registration mode is not limited to the operation of the mode switch 21. For example, the security controller 10 may be modified to be switched to the ID registration mode by using an existing switch provided in the vehicle 2 (e.g., lever combination switch) in a predetermined mode (desirably, in a mode that is preset by and known only by the user or dealer). In this case, the mode switch 21 can be omitted. Also, the security controller 10 can be prevented from being switched unintentionally to the ID registration mode by an erroneous operation of the mode switch 21.

The portable device management apparatus 30 may be arranged not only in a special management center but also in a user's residence. In this case, the portable device management apparatus 30 may be a personal computer or the like.

In the above embodiments, the cellular phone 4 may be designed to transmit registration approval information or a restriction request signal to the portable device management apparatus 30 when receiving a predetermined voice command.

The communication between the cellular phone 4 and the portable device management apparatus 30 may be implemented by conversation between the user and an operator working in the management center where the portable device management apparatus 30 is located. Specifically, the user may call the management center by using the cellular phone 4 and provide an instruction to approve or disapprove registration or a restriction request through conversation with the operator. In this case, the operator as instructed by the user, operates the portable device management apparatus 30 to conduct registration restriction control or function restriction control. In this case, the cellular phone 4 is not required to transmit registration approval information or a restriction request signal to the portable device management apparatus 30.

The security control system may control the security not only of the door lock driver 22 or the engine controller 23, but also the security of other vehicle devices such as a steering lock device, a shift lock device, or a wheel lock device. That is, the security control system may control the security of any device as long as the control of such equipment is effective for restricting or inhibiting the vehicle 2 from traveling normally.

The security control system is not limited to the vehicle security control system 1 for control of vehicle equipment but may be applied to a building security system for controlling the locking and unlocking of a building door.

The present examples and embodiments are to be considered as illustrative and not restrictive, and the invention is not to be limited to the details given herein, but may be modified within the scope and equivalence of the appended claims.

What is claimed is:

1. A security control system for controlling a security device provided with a security function, the system comprising:
    a portable device provided with a communication function and having a portable device ID code;
    a security controller including a recording unit for recording a controller ID code, wherein the security controller communicates with the portable device to determine whether the portable device ID code matches the controller ID code, selectively deactivates the security function of the device in accordance with the determination result, records the portable device ID code in the recording unit to register the portable device ID code as the controller ID code, and transmits a registration signal containing the portable device ID code;
    a portable device management apparatus for receiving the registration signal from the security controller and managing the portable device in accordance with the received registration signal; and
    a portable communication equipment for communicating with the portable device management apparatus and transmitting to the portable device management apparatus registration approval information indicating whether registration of the portable device ID code is approved; and
    wherein the portable device management apparatus determines whether the registration of the portable device ID code contained in the registration signal is approved based on the registration approval information.

2. The system according to claim 1, wherein:
    the security controller transmits the registration signal containing the registered portable device ID code to the portable device management apparatus; and
    the portable device management apparatus receives the registration signal, determines whether the registration of the portable device ID code contained in the registration signal is approved, and provides the portable communication equipment with a warning signal indicating that there is an anomaly in the registration when determining that the registration is not approved.

3. The system according to claim 1, wherein:
    the security controller transmits a registration enablement request signal to the portable device management apparatus;
    the portable device management apparatus determines whether the registration of the portable device ID code is approved based on the registration enablement request signal, and transmits to the security controller a response signal indicating the determination result; and
    the security controller records the portable device ID code in the recording unit when receiving a response signal indicating that the registration of the portable device ID code is approved.

4. The system according to claim 3, wherein the portable device management apparatus provides the portable communication equipment with a warning signal indicating that registration of the portable device ID code is not approved when determining that the registration of the portable device ID code is not approved.

5. The system according to claim 1,
    wherein the portable communication equipment transmits a restriction request signal,
    the portable device management apparatus receives the restriction request signal and transmits a function restriction signal to the security controller; and
    the security controller prohibits or restricts deactivation of the security function of the security device when receiving the function restriction signal.

6. The system according to claim 5, wherein:
    the restriction request signal contains a portable device designation code for designating a portable device;
    the portable device management apparatus transmits to the security controller a function restriction code containing a portable device ID code corresponding to the portable device designation code; and
    the security controller prohibits or restricts deactivation of the security function of the security device based on the portable device ID code contained in the function restriction code.

7. The system according to claim 1, wherein the system is for use in a vehicle having a door and an engine, and the security device includes at least one of a door lock driver, for controlling locking and unlocking of the vehicle door, and an engine controller, for controlling the enabling of engine starting.

8. A security controller for use with a portable device, having a portable device ID code, and a portable device management apparatus, for managing the portable device, wherein the security controller controls a security device provided with a security function, the security controller comprising:
    a portable device communication unit for communicating with the portable device;
    a recording unit for recording a controller ID code corresponding to the portable device ID code;
    a security communication unit for communicating with the portable device management apparatus; and
    a control unit connected to the portable device communication unit, the recording unit, and the security communication unit, the control unit communicating with the portable device to determine whether the portable device ID code matches the controller ID code and selectively deactivating the security function of the security device based on a determination result, wherein the control unit records the portable device ID code in the recording unit to register the portable device ID code as the controller ID code and has the security communication unit transmit a registration signal containing the portable device ID code to the portable device management apparatus, wherein the portable device management apparatus receives registration approval information indicating whether registration of the portable device ID code is approved from a portable communication equipment, and the portable device management apparatus determines whether the registration of the portable device ID code contained in the registration signal is approved based on the registration approval information and transmits to the security communication unit a response signal indicating whether the registration of the portable device ID code contained in the registration signal is approved, and wherein the control unit records the portable device ID code in the recording unit when the security communication unit receives a response signal indicating approval of the registration.

9. The controller according to claim 8, wherein:
the portable device management apparatus transmits a function restriction signal; and
the control unit prohibits or restricts the deactivation of the security function of the security device when the function restriction signal is received by the security communication unit.

10. The controller according to claim 8, wherein the security controller registers the ID code of the portable device when the security communication unit and the control unit are operating normally.

11. A portable device management apparatus for use with a portable device, having a portable device ID code, and a security controller, having a controller ID code, wherein the security controller communicates with the portable device to determine whether the portable device ID code matches the controller ID code, selectively deactivates a security function of a security device based on the determination result, registers the portable device ID code as the controller ID code in the security controller, and transmits a registration signal containing the portable device ID code to the portable device management apparatus, the portable device management apparatus comprising:
a management communication unit for receiving the registration signal from the security controller;
a management control unit, connected to the management communication unit, for managing the portable device based on the portable device ID code contained in the registration signal; and
a portable communication equipment communication unit, connected to the management control unit, for communicating with a portable communication equipment and receives registration approval information indicating whether registration of the portable device ID code is approved from the portable communication equipment,
wherein the management control unit receives the registration approval information from the portable communication equipment communication unit and determines whether the registration of the portable device ID code contained in the registration signal is approved based on the registration approval information.

12. The portable device management apparatus according to claim 11, wherein the management control unit determines whether the registration of the portable device ID code contained in the registration signal is approved and has the portable communication equipment communication unit transmit a warning signal to the portable communication equipment indicating that there is an anomaly in the registration when determining that the registration is not approved.

13. The portable device management apparatus according to claim 11, wherein:
the security controller transmits a registration enablement request signal to the management communication unit when registering the portable device ID code;
the management control unit determines whether the registration of the portable device ID code is approved when receiving the registration enablement request signal and transmits a response signal indicating the determination result to the security controller.

14. The portable device management apparatus according to claim 11, wherein the portable communication equipment communication unit receives a restriction request signal; and
wherein the management control unit transmits to at least one of the security controller and the portable device a function restriction signal for prohibiting or restricting deactivation of the security function of the security device when the portable communication equipment communication unit receives the restriction request signal.

15. A security control method for use with a portable device, having a portable device ID code, a security controller, having a controller ID code, and a portable device management apparatus, the security controller communicating with the portable device to determine whether the portable device ID code matches the controller ID code, and selectively deactivates a security function of a security device based on the determination result, the method comprising:
registering the portable device ID code as the controller ID code in the security controller;
transmitting a registration signal containing the portable device ID code that is to be registered from the security controller to the portable device management apparatus;
managing a portable device corresponding to the portable device ID code contained in the registration signal with the portable device management apparatus;
transmitting registration approval information indicating whether registration of the portable device ID code is approved from a portable communication equipment to the portable device management apparatus; and
determining whether the registration of the portable device ID code contained in the registration signal is approved based on the registration approval information by the portable device management apparatus.

16. The method according to claim 15, further comprising:
transmitting a registration enablement request signal from the security controller to the portable device management apparatus;
determining whether the registration of the portable device ID code is approved when the portable device management apparatus receives the registration enablement request signal and transmitting a response signal indicating a determination result to the security controller; and
receiving a response signal indicating that the registration of the portable device ID code is approved with the security controller and completing registration of the portable device ID code.

17. The method according to claim 15, further comprising:
determining whether the registration of the portable device ID code is approved; and
providing the portable communication equipment with a warning signal indicating that the registration of the portable device ID code is not approved when the registration of the portable device ID code is not approved.

* * * * *